(12) United States Patent
Yang et al.

(10) Patent No.: US 11,199,346 B2
(45) Date of Patent: Dec. 14, 2021

(54) VAPOUR-LIQUID FILTER MESH, HEAT EXCHANGER AND AIR CONDITIONER

(71) Applicant: GREE ELECTRIC APPLIANCES, INC. OF ZHUHAI, Guangdong (CN)

(72) Inventors: Xufeng Yang, Guangdong (CN); Dongbing Hu, Guangdong (CN); Haili Hu, Guangdong (CN); Haoliang You, Guangdong (CN); Ying Zhang, Guangdong (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 371 days.

(21) Appl. No.: 16/346,697

(22) PCT Filed: Oct. 12, 2017

(86) PCT No.: PCT/CN2017/105783
§ 371 (c)(1),
(2) Date: May 1, 2019

(87) PCT Pub. No.: WO2018/082434
PCT Pub. Date: May 11, 2018

(65) Prior Publication Data
US 2020/0182521 A1  Jun. 11, 2020

(30) Foreign Application Priority Data
Nov. 2, 2016 (CN) .......................... 201610957560.5

(51) Int. Cl.
*B01D 1/30* (2006.01)
*F25B 43/00* (2006.01)
(Continued)

(52) U.S. Cl.
CPC .............. *F25B 43/003* (2013.01); *B01D 1/30* (2013.01); *B01D 1/305* (2013.01); *F25B 39/00* (2013.01);
(Continued)

(58) Field of Classification Search
CPC ......... B01D 1/30; B01D 1/305; F25B 43/003; F25B 39/00; F25B 39/02; F25B 2339/024
See application file for complete search history.

(56) References Cited

U.S. PATENT DOCUMENTS 2,325,657 A * 7/1943 Burkness .............. F25B 43/003
210/94
3,248,305 A * 4/1966 Williamson ............. B01D 3/10
202/180
(Continued)

FOREIGN PATENT DOCUMENTS

CN    203024507 U    6/2013
CN    203024508 U    6/2013
(Continued)

OTHER PUBLICATIONS

English Translation of International Search Report for International Application No. PCT/CN2017/105783, dated Jan. 17, 2018, 2 pages.

*Primary Examiner* — Jonathan Miller
(74) *Attorney, Agent, or Firm* — Armstrong Teasdale LLP (57) ABSTRACT

Disclosed are a vapour-liquid filter mesh, a heat exchanger and an air conditioner. The vapour-liquid filter mesh includes a first area located in the middle and a second area located at the periphery of the first area, and the thickness of the second area is greater than the thickness of the first area.

17 Claims, 7 Drawing Sheets

(51) Int. Cl.
*F25B 39/00* (2006.01)
*F25B 39/02* (2006.01)

(52) U.S. Cl.
CPC ......... *F25B 39/02* (2013.01); *F25B 2339/024* (2013.01)

(56) References Cited

U.S. PATENT DOCUMENTS

| | | | | |
|---|---|---|---|---|
| 3,721,069 | A * | 3/1973 | Walker | F01M 11/08 55/319 |
| 4,084,945 | A * | 4/1978 | Chirico | B01D 1/30 95/287 |
| 4,184,858 | A * | 1/1980 | Walker | B01D 46/10 96/265 |
| 4,364,756 | A | 12/1982 | Clarke et al. | |
| 4,409,064 | A * | 10/1983 | Vora | C01B 17/88 159/31 |
| 4,504,289 | A * | 3/1985 | Waller | B01D 53/261 96/138 |
| 5,156,706 | A * | 10/1992 | Sephton | B01D 1/0082 159/47.1 |
| 5,536,298 | A * | 7/1996 | Awaji | B01D 46/00 55/329 |
| 6,419,729 | B1 * | 7/2002 | Duffy | B01D 39/163 55/385.6 |
| 8,021,455 | B2 * | 9/2011 | Adamek | B01D 46/10 55/486 |
| 8,029,587 | B2 * | 10/2011 | Kaneko | B01D 29/114 55/418 |
| 8,425,668 | B2 * | 4/2013 | Lakatos | B01D 1/305 95/267 |
| 9,366,464 | B2 * | 6/2016 | Sonninen | F25B 43/00 |
| 10,767,897 | B2 * | 9/2020 | Yu | F24F 1/035 |
| 2011/0140457 | A1 * | 6/2011 | Lakatos | B03D 1/245 290/1 R |
| 2013/0319039 | A1 * | 12/2013 | Sonninen | F25B 43/00 62/515 |
| 2017/0348626 | A1 * | 12/2017 | Sakano | B01D 46/0001 |

FOREIGN PATENT DOCUMENTS

| | | |
|---|---|---|
| CN | 103925747 A | 7/2014 |
| CN | 204460859 U | 7/2015 |
| CN | 205536720 U | 8/2016 |
| CN | 106382774 A | 2/2017 |
| CN | 206320965 U | 7/2017 |
| WO | 2012107645 A1 | 8/2012 |

* cited by examiner

VAPOUR-LIQUID FILTER MESH, HEAT EXCHANGER AND AIR CONDITIONER

CROSS-REFERENCE TO RELATED APPLICATIONS

This application is the national stage entry of PCT/CN2017/105783, filed on Oct. 12, 2017, which claims the benefit of priority to Chinese Patent Application No. 201610957560.5, filed Nov. 2, 2016, which are incorporated by reference in their entirety herein.

TECHNICAL FIELD

The present disclosure relates to a technical field of air conditioning, and in particular to a vapour-liquid filter mesh, a heat exchanger and an air conditioner.

BACKGROUND

Figure 1:
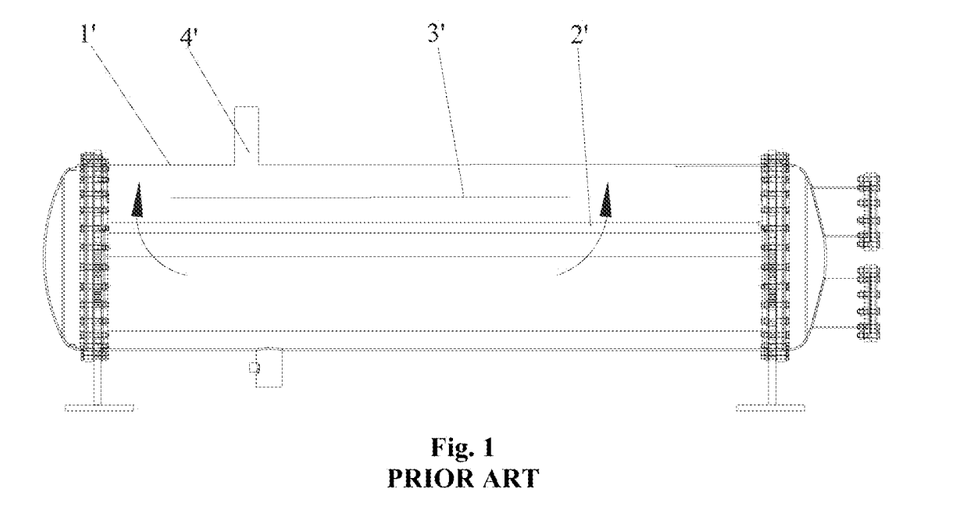
FIG. 1 illustrates a structural schematic diagram of a heat exchanger in a related art.
Figure 2:
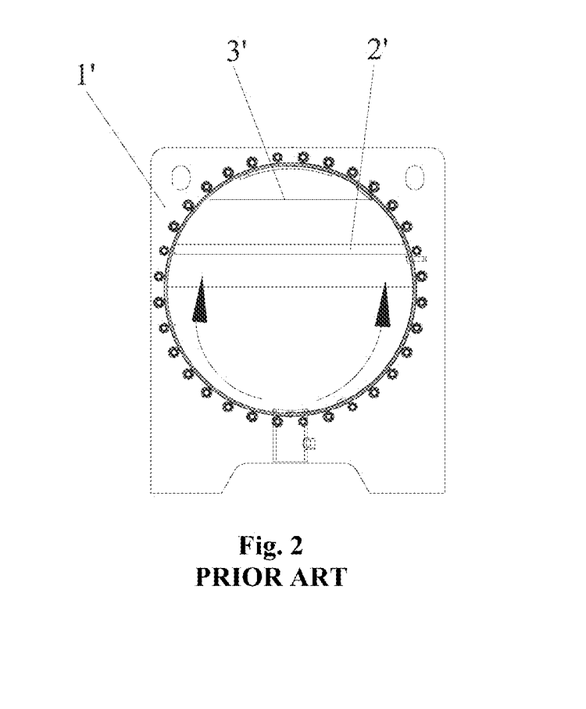
FIG. 2 illustrates a cross-sectional structural schematic diagram of a heat exchanger in a related art.

A vapour-liquid filter mesh takes a vapour-liquid separation effect in a flooded evaporator and the working principles include impact inertial separation, sieving action and adsorption action. The vapour-liquid filter mesh is intended to prevent the problem of liquid entrainment of a compressor when a machine set operates and improve the operation safety of the compressor. FIG. 1 and FIG. 2 respectively illustrate a schematic diagram of a refrigerant flowing structure of a related heat exchanger. The heat exchanger includes a housing 1', a vapour-liquid filter mesh 2', a liquid baffle plate 3' and an air outlet pipe 4', a filter mesh structure of the heat exchanger is of a flat-plate structure; and filter meshes are evenly disposed. When the flow speed of a refrigerant to pass through the filter mesh is too fast, the pressure drop is large and more liquid drops are brought away due to the inertia; and when the flow speed of the refrigerant to pass through the filter mesh is too slow, more liquid drops are passed through a diffusion motion, so that the vapour-liquid separation effect of a vapour-liquid separator is also affected. In this sense, the related filter mesh often has the uneven flowing condition of the refrigerant to affect the vapour-liquid separation efficiency of the filter mesh and reduce the vapour-liquid separation effect of the filter mesh.

SUMMARY

The embodiments of the present disclosure provide a vapour-liquid filter mesh, a heat exchanger and an air conditioner, so that a refrigerant flowing through the filter mesh can flow more evenly to ensure the vapour-liquid separation efficiency of the filter mesh and improve the vapour-liquid separation effect of the filter mesh.

To this end, an embodiment of the present disclosure provides a vapour-liquid filter mesh, which includes a first area located in a middle and a second area located at a periphery of the first area; and a thickness of the second area is greater than a thickness of the first area.

In an exemplary embodiment, an area A of the first area and an area B of the second area meet $\frac{1}{2}B \leq A < B$.

In an exemplary embodiment, each of the first area and the second area includes a plurality of layers of filter meshes; and a number of the layers of filter meshes in the second area is greater than a number of the layers of filter meshes in the first area.

In an exemplary embodiment, the number of the layers of filter meshes in the first area is greater than or equal to $\frac{1}{3}$ of the number of the layers of filter meshes in the second area.

In an exemplary embodiment, the vapour-liquid filter mesh includes a border and a reinforcing rib disposed in the border; and the filter meshes are filled in frames formed by the border and the reinforcing rib.

In an exemplary embodiment, each of the first area and the second area is provided with a flat-plate filter mesh, the first area is located in the second area, and the second area is flush with a bottom surface of the first area.

In an exemplary embodiment, the first area is protruded from the second area, a connection hole is formed in a middle of the second area, and a periphery of the first area is fixedly connected with a periphery of the connection hole.

In an exemplary embodiment, each of the first area and the second area is provided with a flat-plate filter mesh, the first area is protruded from the second area; and an outer periphery of the first area and the periphery of the connection hole of the second area are fixedly spliced together.

In an exemplary embodiment, the first area is provided with an arc protruded filter mesh; the second area is provided with a flat-plate filter mesh, and an outer periphery of the arc protruded filter mesh is fixedly connected at a periphery of a connection hole of the flat-plate filter mesh.

In an exemplary embodiment, the first area is provided with a conical protruded filter mesh having a progressively decreased cross section along a direction far away from the second area, the second area is provided with a flat-plate filter mesh, and an outer periphery of the conical protruded filter mesh is fixedly connected at a periphery of a connection hole of the flat-plate filter mesh.

In an exemplary embodiment, each of lateral plates of the conical protruded filter mesh is welded together.

According to another aspect of the present disclosure, there is provided a heat exchanger, which includes a housing and a vapour-liquid filter mesh, the vapour-liquid filter mesh is the above-mentioned vapour-liquid filter mesh; and the vapour-liquid filter mesh is disposed in the housing.

According to a still another aspect, there is provided a heat exchanger, which includes a housing, a liquid baffle plate and a vapour-liquid filter mesh, the vapour-liquid filter mesh is the above-mentioned vapour-liquid filter mesh, the vapour-liquid filter mesh is disposed in the housing, and a first area of the vapour-liquid filter mesh is protruded toward the liquid baffle plate.

According to a still another aspect, there is provided an air conditioner, which includes a heat exchanger, and the heat exchanger is the above-mentioned heat exchanger.

By applying some embodiments of the present disclosure, the vapour-liquid filter mesh includes the first area located in the middle and the second area located at the periphery of the first area, and the thickness of the second area is greater than the thickness of the first area. In a refrigerant flowing process, the flow speed of the refrigerant below the first area located in the middle is slow, and the flow speed of the refrigerant in the second area located at the periphery is fast, so by increasing the thickness of the filter mesh in the area with the large flow intensity and decreasing the thickness of the filter mesh in the area with the slow flowing, the two flowing areas are adjusted into different thicknesses according to the flow speed of the refrigerant, and therefore, the separation capacity of the filter mesh in the high-speed area is enhanced, the fluid is accelerated to flow to the low-speed area, the adsorption capacity of the filter mesh in the low-speed area is increased, the refrigerant flowing through the filter mesh flows more evenly, the pressure drop of the refrigerant in flowing is reduced, the vapour-liquid separation efficiency of the filter mesh is guaranteed and the vapour-liquid separation effect of the filter mesh is improved.

Numerals in the drawings: 1. first area; 2. second area; 3. border; 4. reinforcing rib; 5. housing; 6. liquid baffle plate; 7. vapour-liquid filter mesh.

DETAILED DESCRIPTION OF THE EMBODIMENTS

The present disclosure will be further described below in detail in combination with the accompanying drawings and specific embodiments. However, the description is not intended to limit the present disclosure.

Figure 3:
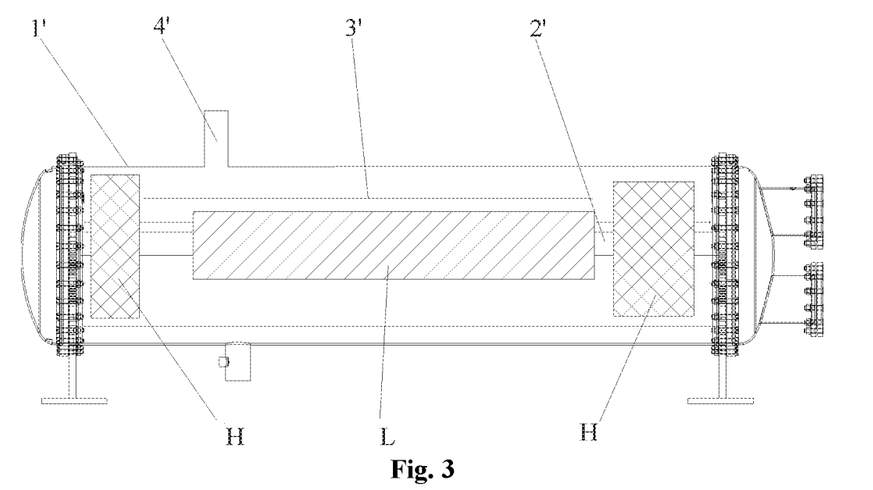
FIG. 3 illustrates a structural diagram of a flow speed distribution of a refrigerant inside a heat exchanger in a related art.
Figure 4:
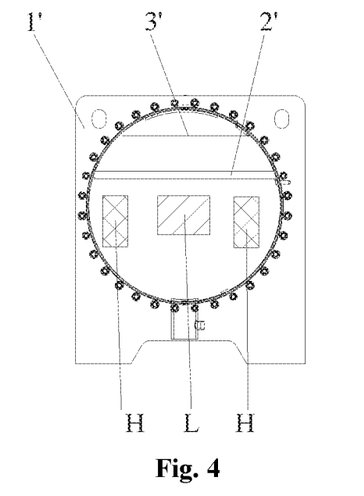
FIG. 4 illustrates a structural diagram of a flow speed distribution of a refrigerant in a cross-sectional direction of a heat exchanger in a related art.

Referring to FIG. 3 and FIG. 4 together, it is founded by the applicant in a research process that an area L nearly below a liquid baffle plate is a low-speed flowing area, and an area H nearly attached to an edge of a housing and close to an inlet of the liquid baffle plate is a high-speed flowing area. In the high-speed flowing area, the liquid drop carrying capacity is strong, and the mesh separation capacity is reduced. However, by providing a filter mesh same as that of the high-speed area in the low-speed flowing area, the overall pressure drop of an evaporator is often increased.

Based on the above findings, the following solutions are pushed forward by the applicant.

Referring to FIG. 5 to FIG. 17 together, according to an embodiment of the present disclosure, a vapour-liquid filter mesh includes a first area 1 located in a middle and a second area 2 located at a periphery of the first area 1, and a thickness of the second area 2 is greater than a thickness of the first area 1.

In a refrigerant flowing process, the flow speed of the refrigerant below the first area 1 located in the middle is slower, but the flow speed of the refrigerant in the second area 2 located at the periphery is faster, so by increasing the thickness of the filter mesh in the area with the large flow intensity and decreasing the thickness of the filter mesh in the area with the slow flowing, the two flowing areas are adjusted into different thicknesses according to the flow speed of the refrigerant; and therefore, the separation capacity of the filter mesh in the high-speed area is enhanced, the fluid is accelerated to flow to the low-speed area, the adsorption capacity of the filter mesh in the low-speed area is increased, the refrigerant flowing through the filter mesh flows more evenly, the pressure drop of the refrigerant in flowing is reduced, the vapour-liquid separation efficiency of the filter mesh is guaranteed and the vapour-liquid separation effect of the filter mesh is improved.

In a design process, an area A of the first area 1 of the vapour-liquid filter mesh and an area B of the second area 2 meet $\frac{1}{2}B \leq A < B$, so that the problem that the thicknesses of the filter meshes in the refrigerant fast-flowing area and refrigerant slow-flowing area cannot be adjusted well due to excessively large or small area of the first area 1 is prevented, the reasonable area distribution of the vapour-liquid filter mesh in the refrigerant fast-flowing area and refrigerant slow-flowing area is guaranteed, the refrigerant flowing through the vapour-liquid filter mesh can flow more evenly and the vapour-liquid separation efficiency and vapour-liquid separation effect are better.

The first area 1 and the second area 2 are different in thickness, which may be implemented in various manners. For example, areas having different thicknesses are directly machined on an integral filter mesh structure to meet the design requirement on the first area 1 and the second area 2, or different layers of filter meshes are respectively provided at the first area 1 and the second area 2, no matter how the moulded structure of the filter mesh is, as long as the requirement on the structural design of the first area 1 and the second area 2 can be implemented, all should be included in a scope of protection of the present disclosure.

In an exemplary embodiment, each of the first area 1 and the second area 2 includes a plurality of layers of filter meshes, and a number of the layers of filter meshes in the second area 2 is greater than a number of the layers of filter meshes in the first area 1. By respectively providing different numbers of the layers of filter meshes at the first area 1 and the second area 2, the moulding difficulty of the vapour-liquid filter mesh can be reduced, the moulding efficiency of the vapour-liquid filter mesh is improved and thus the machining cost is reduced.

In an exemplary embodiment, the number of the layers of filter meshes in the first area 1 is greater than or equal to ⅓ of the number of the layers of filter meshes in the second area 2, so that the number of the layers of filter meshes in the first area 1 is not too small to affect the filtration and adsorption capacity of the first area 1 to the refrigerant and the overall filter effect of the vapour-liquid filter mesh is guaranteed. For example, when six layers of filter meshes are provided in the second area 2, 2-5 layers of filter meshes are provided in the first area 1.

Figure 13:
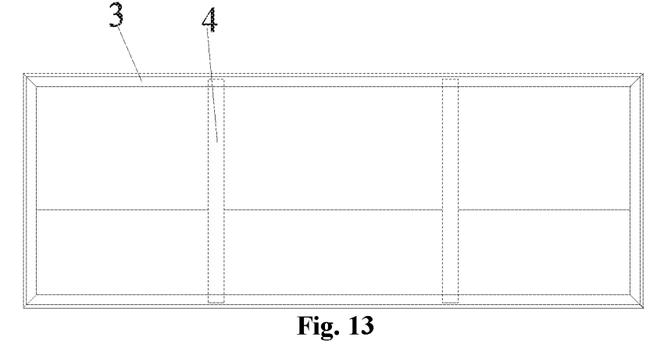
FIG. 13 illustrates a framework structural schematic diagram of a vapour-liquid filter mesh in an embodiment of the present disclosure.

The vapour-liquid filter mesh includes a border 3 and reinforcing ribs 4 disposed in the border 3, and the filter meshes are filled in frames formed by the border 3 and the reinforcing ribs 4. The border 3 is cooperated with the reinforcing ribs 4, so that the frames have a high structural strength, and the overall vapour-liquid filter is also moulded more conveniently and reliably. The frames are supported by using an anticorrosive material such as a stainless steel material and may also be supported by using an iron wire material, thus reducing the material cost. In the manufacturing process of the vapour-liquid filter mesh, the border 3, the reinforcing ribs 4 and other materials are first used to make a support structure, then multiple layers of filter meshes are filled in the support structure and at last the meshes are fixed for moulding.

Figure 5:
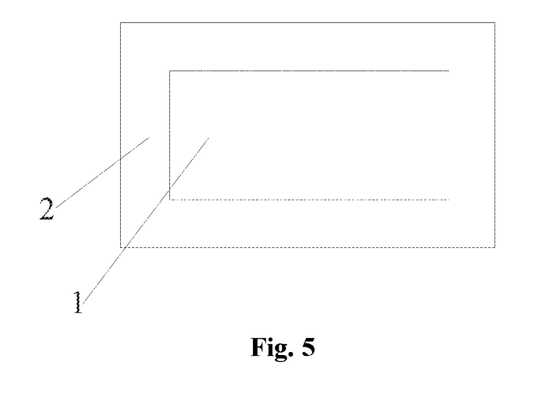
FIG. 5 illustrates a structural schematic diagram of a vapour-liquid filter mesh in a first embodiment of the present disclosure.
Figure 6:
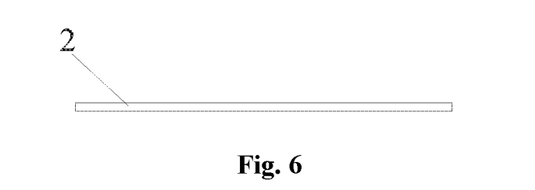
FIG. 6 illustrates a bottom structural schematic diagram of a vapour-liquid filter mesh in a first embodiment of the present disclosure.

Referring to FIG. 5 and FIG. 6 together, according to a first embodiment of the present disclosure, in the vapour-liquid filter mesh, each of the first area 1 and the second area 2 is provided with a flat-plate filter mesh; the first area 1 is located in the second area 2, and the second area 2 is flush with a bottom surface of the first area 1. The structural moulding is simple and convenient, and the cost is low; the vapour-liquid filter mesh may be directly moulded, and the first area 1 and the second area 2 may be integrally moulded to guarantee the consistency of the overall structure.

In other embodiments, the first area 1 and the second area 2 of the vapour-liquid filter mesh are not located on a plane and both are also not integrally moulded but are independently moulded and then fixedly connected together, herein the first area 1 is protruded from the second area 2, a connection hole is formed in a middle of the second area 2, and a periphery of the first area 1 is fixedly connected with a periphery of the connection hole.

Figure 7:
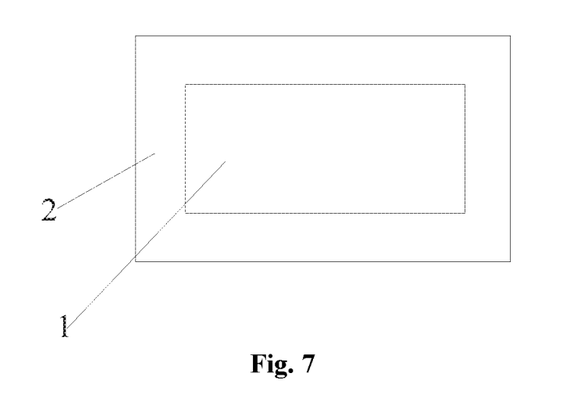
FIG. 7 illustrates a structural schematic diagram of a vapour-liquid filter mesh in a second embodiment of the present disclosure.
Figure 8:
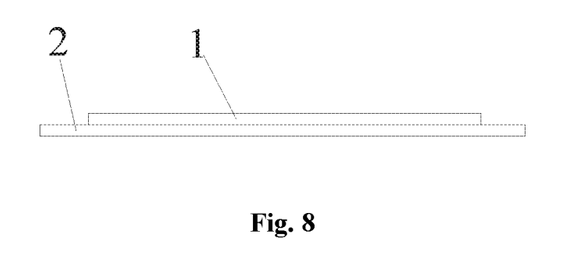
FIG. 8 illustrates a bottom structural schematic diagram of a vapour-liquid filter mesh in a second embodiment of the present disclosure.

Referring to FIG. 7 and FIG. 8 together, according to a second embodiment of the present disclosure, in this embodiment, the first area 1 and the second area 2 of the vapour-liquid filter mesh both are provided with a flat-plate filter mesh, the first area 1 is protruded from the second area 2, and an outer periphery of the first area 1 and the periphery of the connection hole of the second area 2 are fixedly spliced together. The moulded vapour-liquid filter mesh is welded by adopting a two-layer structure, the outer periphery of the protruded first area 1 is connected with the inner periphery of the connection hole of the second area 2 on the lower layer by welding, so that the connection structure is more stable. The structure moulded by the first area 1 and the second area 2 is displayed as a sunken structure at a refrigerant inlet end, so in the flowing process of the refrigerant, the refrigerant in the second area 2 flows to the first area 1 to enhance the adsorption effect of the first area 1. The filter meshes in the first area 1 and second area 2 in this embodiment are of the flat-plate structure and are only welded together after moulding, so the moulding structures of the first area and the second area are simple, the machining is more convenient and the machining cost is also low.

Figure 9:
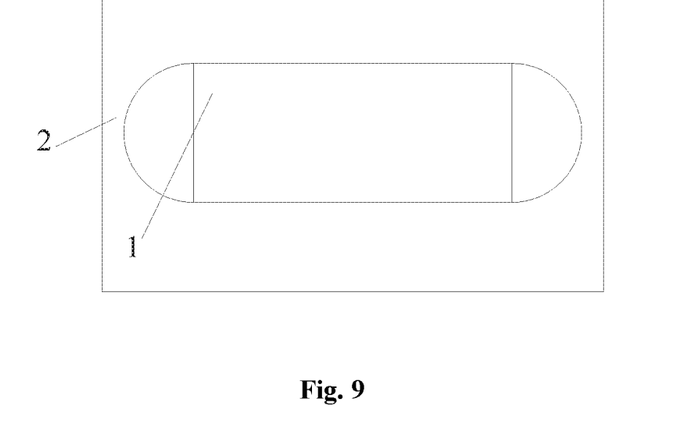
FIG. 9 illustrates a structural schematic diagram of a vapour-liquid filter mesh in a third embodiment of the present disclosure.
Figure 10:
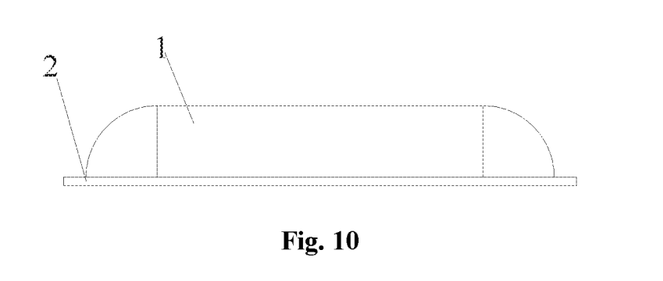
FIG. 10 illustrates a bottom structural schematic diagram of a vapour-liquid filter mesh in a third embodiment of the present disclosure.

Referring to FIG. 9 and FIG. 10 together, according to a third embodiment of the present disclosure, in this embodiment, the first area 1 of the vapour-liquid filter mesh is provided with an arc protruded filter mesh, the second area 2 is provided with a flat-plate filter mesh; and an outer periphery of the arc protruded filter mesh is fixedly connected at a periphery of a connection hole of the flat-plate filter mesh. In this embodiment, compared with the vapour-liquid filter mesh having the same cross section in the first embodiment and second embodiment, the vapour-liquid filter mesh in this embodiment has a larger vapour-liquid filtration area; and the arc structure is more beneficial to the condensation and drop of liquid drops, and the flow resistance is smaller.

Figure 11:
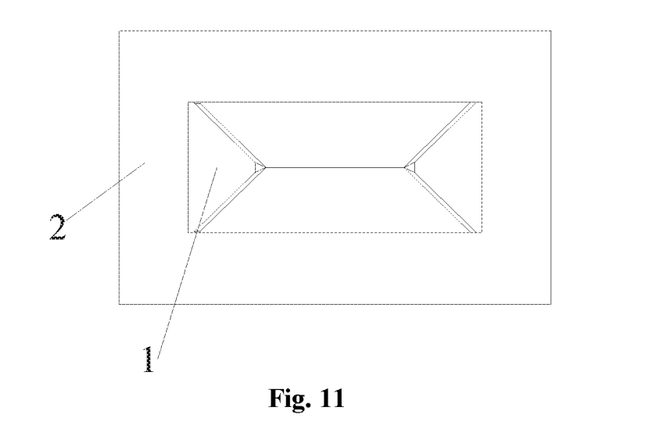
FIG. 11 illustrates a structural schematic diagram of a vapour-liquid filter mesh in a fourth embodiment of the present disclosure.
Figure 12:
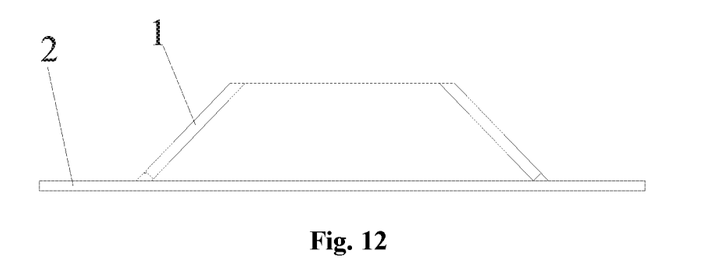
FIG. 12 illustrates a bottom structural schematic diagram of a vapour-liquid filter mesh in a fourth embodiment of the present disclosure.

Referring to FIG. 11 and FIG. 12 together, according to a fourth embodiment of the present disclosure, in this embodiment, the first area 1 of the vapour-liquid filter mesh is provided with a conical protruded filter mesh having a progressively decreased cross section along a direction far away from the second area 2, the second area 2 is provided with a flat-plate filter mesh; and an outer periphery of the conical protruded filter mesh is fixedly connected at a periphery of a connection hole of the flat-plate filter mesh. In an exemplary embodiment, each of lateral plates of the conical protruded filter mesh is welded together.

By disposing the first area 1 into the conical protruded filter mesh having the progressively decreased cross section along the direction far away from the second area 2, except for the advantages of larger vapour-liquid filtration area and easy condensation of liquid drops, compared with the third embodiment, the structure in this embodiment is easier to splice and weld a module and the moulding is more simple and convenient.

The above protruded structure is not limited to be arc and conical, and may also be wavy or trapezoidal and the like.

Figure 14:
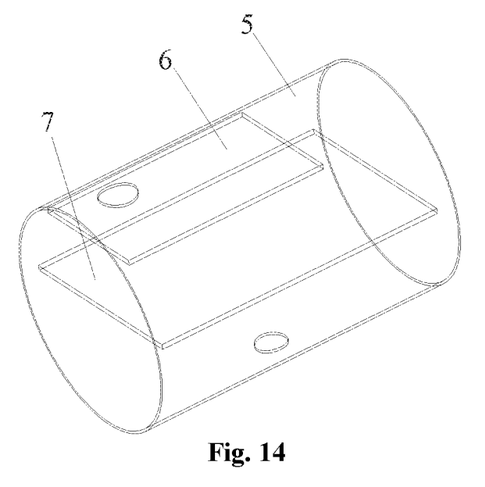
FIG. 14 illustrates a stereoscopic structural schematic diagram of a heat exchanger in a first embodiment of the present disclosure.

Referring to FIG. 14, a heat exchanger according to the first embodiment of the present disclosure includes a housing 5 and a vapour-liquid filter mesh 7, the vapour-liquid filter mesh 7 is the above-mentioned vapour-liquid filter mesh, and the vapour-liquid filter mesh 7 is disposed in the housing 5. The vapour-liquid filter mesh adopted by the heat exchanger is the vapour-liquid filter mesh of the first embodiment shown in FIG. 5 and FIG. 6.

Figure 15:
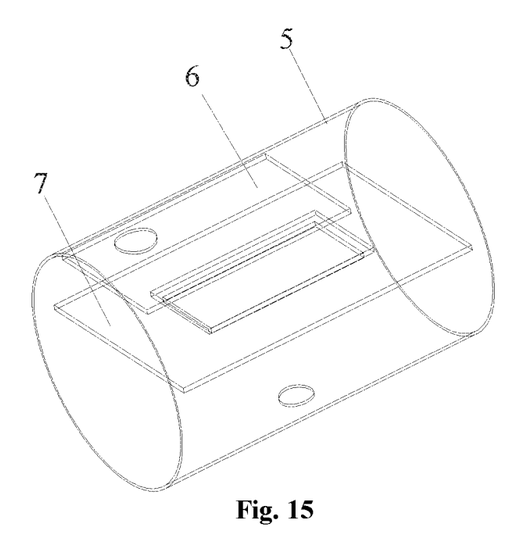
FIG. 15 illustrates a stereoscopic structural schematic diagram of a heat exchanger in a second embodiment of the present disclosure.
Figure 16:
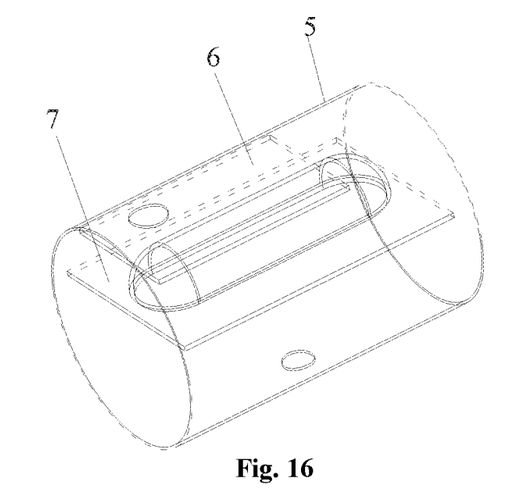
FIG. 16 illustrates a stereoscopic structural schematic diagram of a heat exchanger in a third embodiment of the present disclosure.
Figure 17:
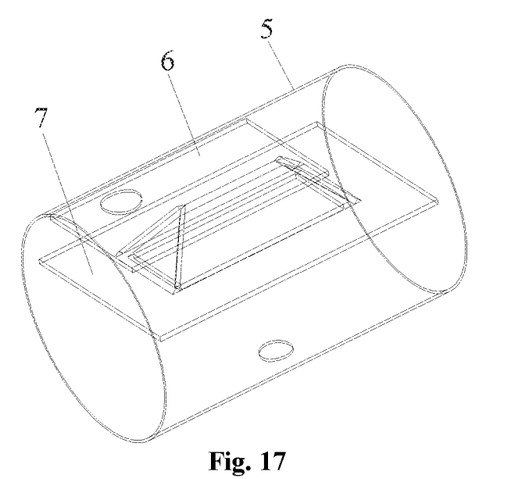
FIG. 17 illustrates a stereoscopic structural schematic diagram of a heat exchanger in a fourth embodiment of the present disclosure.

Referring to FIG. 15 to FIG. 17 together, according to an embodiment of the present disclosure, a heat exchanger includes a housing 5, a liquid baffle plate 6 and a vapour-liquid filter mesh 7, the vapour-liquid filter mesh 7 is the above-mentioned vapour-liquid filter mesh with a protruded structure, the vapour-liquid filter mesh 7 is disposed in the housing 5, and a first area 1 of the vapour-liquid filter mesh 7 is protruded toward the liquid baffle plate 6.

In this embodiment, the vapour-liquid filter mesh 7 is mounted below the liquid baffle plate 6, to prevent the generation of noise, the protruded structure cannot be contacted and interfered with the liquid baffle plate 6 and also cannot be contacted and interfered with lower heat exchange pipes.

In view of the structural strength of the vapour-liquid filter mesh, a width of each side of the second area 2 should not be smaller than 20 cm, and a distance between a toppest end of the protruded structure and the liquid baffle plate 6 should not be smaller than 10 cm.

Referring to FIG. 15, according to the heat exchanger in the second embodiment of the present disclosure, the adopted vapour-liquid filter mesh is the vapour-liquid filter mesh as shown in FIG. 7 and FIG. 8.

Referring to FIG. 16, according to the heat exchanger in the third embodiment of the present disclosure, the adopted vapour-liquid filter mesh is the vapour-liquid filter mesh as shown in FIG. 9 and FIG. 10.

Referring to FIG. 17, according to the heat exchanger in the third embodiment of the present disclosure, the adopted vapour-liquid filter mesh is the vapour-liquid filter mesh as shown in FIG. 11 and FIG. 12.

According to an embodiment of the present disclosure, an air conditioner includes a heat exchanger; and the heat exchanger is the above-mentioned heat exchanger.

Certainly, the above are only preferred embodiments of the present disclosure. It is to be noted that those of ordinary skill in the art may further make a plurality of improvements and modifications without departing from the basic principles of the present disclosure, and these improvements and modifications are also considered as the scope of protection of the present disclosure.

What is claimed is:

1. A vapour-liquid filter mesh, comprising a first area located in a middle and a second area located at a periphery of the first area, a thickness of the second area being greater than a thickness of the first area, wherein the first area is protruded from the second area, a connection hole is formed in a middle of the second area; and a periphery of the first area is fixedly connected with a periphery of the connection hole.

2. The vapour-liquid filter mesh as claimed in claim 1, wherein an area A of the first area and an area B of the second area meet $½B≤A<B$.

3. The vapour-liquid filter mesh as claimed in claim 1, wherein each of the first area and the second area comprises a plurality of layers of filter meshes; and a number of layers of filter meshes in the second area is greater than a number of layers of filter meshes in the first area.

4. The vapour-liquid filter mesh as claimed in claim 3, wherein the number of the layers of filter meshes in the first area is greater than or equal to $⅓$ of the number of the layers of filter meshes in the second area.

5. The vapour-liquid filter mesh as claimed in claim 3, wherein the vapour-liquid filter mesh comprises a border and a reinforcing rib disposed in the border, and the plurality of layers of filter meshes in each of the first area and the second area are filled in frames formed by the border and the reinforcing rib.

6. The vapour-liquid filter mesh as claimed in claim 1, wherein each of the first area and the second area is a flat-plate filter mesh; the first area is located in the second area, and the second area is flush with a bottom surface of the first area.

7. The vapour-liquid filter mesh as claimed in claim 1, wherein each of the first area and the second area is provided with a flat-plate filter mesh, the first area is protruded from the second area, and an outer periphery of the first area and the periphery of the connection hole of the second area are fixedly spliced together.

8. The vapour-liquid filter mesh as claimed in claim 1, wherein the first area is provided with an arc protruded filter mesh, the second area is provided with a flat-plate filter mesh, and an outer periphery of the arc protruded filter mesh is fixedly connected at a periphery of the connection hole of the flat-plate filter mesh.

9. The vapour-liquid filter mesh as claimed in claim 1, wherein the first area is provided with a conical protruded filter mesh having a progressively decreased cross section along a direction far away from the second area, the second area is provided with a flat-plate filter mesh, and an outer periphery of the conical protruded filter mesh is fixedly connected at a periphery of a connection hole of the flat-plate filter mesh.

10. The vapour-liquid filter mesh as claimed in claim 9, wherein the conical protruded filter mesh comprises a plurality of lateral plates, the plurality of lateral plates are welded together.

11. A heat exchanger, comprising a housing and vapour-liquid filter mesh as claimed in claim 1, and the vapour-liquid filter mesh is disposed in the housing.

12. A heat exchanger, comprising a housing, a liquid baffle plate and vapour-liquid filter mesh as claimed in claim 1, the vapour-liquid filter mesh is disposed in the housing, and a first area of the vapour-liquid filter mesh is protruded toward the liquid baffle plate.

13. An air conditioner, comprising a heat exchanger, wherein the heat exchanger is the heat exchanger as claimed in claim 11.

14. The vapour-liquid filter mesh as claimed in claim 2, wherein each of the first area and the second area is a flat-plate filter mesh; the first area is located in the second area, and the second area is flush with a bottom surface of the first area.

15. The vapour-liquid filter mesh as claimed in claim 3, wherein each of the first area and the second area is a flat-plate filter mesh; the first area is located in the second area, and the second area is flush with a bottom surface of the first area.

16. The vapour-liquid filter mesh as claimed in claim 4, wherein each of the first area and the second area is a flat-plate filter mesh; the first area is located in the second area, and the second area is flush with a bottom surface of the first area.

17. The vapour-liquid filter mesh as claimed in claim 5, wherein each of the first area and the second area is a flat-plate filter mesh; the first area is located in the second area, and the second area is flush with a bottom surface of the first area.

* * * * *